US012563408B2

(12) United States Patent
Akhundov et al.

(10) Patent No.: US 12,563,408 B2
(45) Date of Patent: Feb. 24, 2026

(54) APPARATUS AND METHOD FOR PROVIDING A MAINTENANCE PLAN IN A TELECOMMUNICATION NETWORK

(71) Applicant: RAKUTEN MOBILE, INC., Tokyo (JP)

(72) Inventors: Ziya Akhundov, Tokyo (JP); Trevor Wieland, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 627 days.

(21) Appl. No.: 17/917,130

(22) PCT Filed: Jul. 25, 2022

(86) PCT No.: PCT/US2022/038169
§ 371 (c)(1),
(2) Date: Oct. 5, 2022

(87) PCT Pub. No.: WO2024/025511
PCT Pub. Date: Feb. 1, 2024

(65) Prior Publication Data
US 2024/0224060 A1 Jul. 4, 2024

(51) Int. Cl.
*H04W 16/18* (2009.01)
*H04W 64/00* (2009.01)
(52) U.S. Cl.
CPC ......... *H04W 16/18* (2013.01); *H04W 64/003* (2013.01)
(58) Field of Classification Search
CPC ... H04W 16/18; H04W 64/003; H04W 24/02; H04W 24/04; H04W 36/00833
See application file for complete search history.

(56) References Cited

U.S. PATENT DOCUMENTS

| | | | |
|---|---|---|---|
| 8,774,527 B1 * | 7/2014 | Anguelov | G06V 20/70 709/200 |
| 9,444,533 B1 * | 9/2016 | Naim | H04W 64/006 |
| 10,477,426 B1 * | 11/2019 | Tiwari | H04L 43/0852 |
| 2012/0083281 A1 * | 4/2012 | Watanabe | H04W 24/02 455/446 |

(Continued)

FOREIGN PATENT DOCUMENTS

| | | |
|---|---|---|
| EP | 3 908 031 A1 | 11/2021 |
| WO | 03/021996 A1 | 3/2003 |

OTHER PUBLICATIONS

International Search Report dated Nov. 3, 2022 in International Application No. PCT/US22/38169.

(Continued)

*Primary Examiner* — Santiago Garcia
(74) *Attorney, Agent, or Firm* — Sughrue Mion, PLLC

(57) ABSTRACT

An apparatus and method for selecting an upgrade sequence of cell sites in a radio access network are provided. The apparatus includes a memory storing instructions; and at least one processor configured to execute the instructions to: determine, for each cell site pair from among a plurality of cell sites, a pairing score based on a coverage overlap between the cell sites, split the plurality of cell sites into at least two batches based on the determined pairing score for each cell site pair, and determine which cell sites, of the plurality of cell sites, can be upgraded simultaneously based on the split into the at least two batches.

18 Claims, 5 Drawing Sheets

(56) References Cited

U.S. PATENT DOCUMENTS

| | | | |
|---|---|---|---|
| 2013/0114577 A1* | 5/2013 | Cai | H04L 5/0053 |
| | | | 370/336 |
| 2013/0190024 A1* | 7/2013 | Hayase | H04B 15/00 |
| | | | 455/501 |
| 2015/0195818 A1* | 7/2015 | Davydov | H04W 72/23 |
| | | | 370/329 |
| 2015/0195819 A1* | 7/2015 | Kwon | H04L 1/0026 |
| | | | 370/329 |
| 2018/0115913 A1* | 4/2018 | Menon | H04W 16/28 |
| 2018/0343620 A1* | 11/2018 | Nama | H04W 52/34 |

OTHER PUBLICATIONS

Written Opinion of the International Searching Authority dated Nov. 3, 2022 in International Application No. PCT/US22/38169.

* cited by examiner

100

| GRAPHS | PARING SCORE | BATCH SPLIT 1 | | BATCH SPLIT 2 | |
|---|---|---|---|---|---|
| AF | 0.8 | A | E | B | E |
| AE | 0.9 | D | F | | F |
| DF | 0.75 | C | B | | |
| DE | 0.6 | | | | |
| BE | 0.6 | | | | |
| BD | 0.7 | | | | |
| BC | 0.7 | | | | |
FIG. 3C
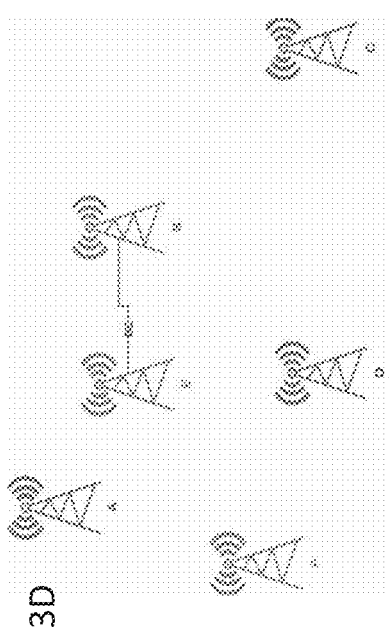
FIG. 3D
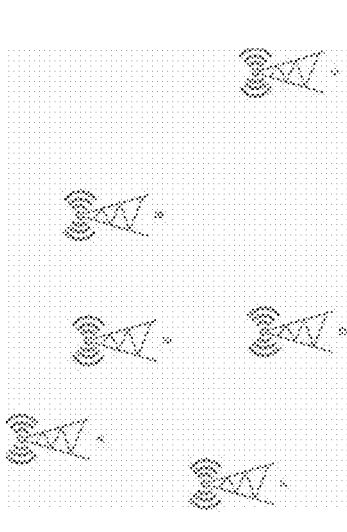
FIG. 3A
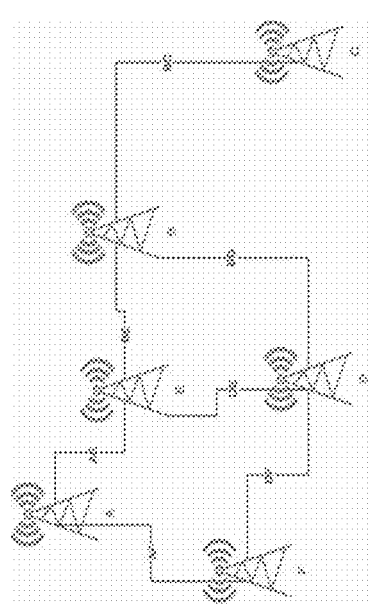
FIG. 3B

APPARATUS AND METHOD FOR PROVIDING A MAINTENANCE PLAN IN A TELECOMMUNICATION NETWORK

CROSS REFERENCE TO RELATED APPLICATIONS

This application is a National Stage of International Application No. PCT/US2022/038169 filed Jul. 25, 2022.

TECHNICAL FIELD

Apparatuses and methods consistent with example embodiments of the present disclosure relate to a maintenance plan for telecommunications network, and, in particular, to a method for selecting an upgrade sequence of cell sites in a radio access network to update network infrastructure.

BACKGROUND

Downtime losses during network maintenance have negative impact on both operators and users of a random access network (RAN) alike. RAN operators strive to operate a RAN without any downtime, since even small periods of downtime may lead to a substantial negative impact on the RAN users. However, in reality, it is often necessary to perform security critical updates for the RAN infrastructure. Thus, RAN operators must shut down cell sites during operation of the RAN to perform critical updates, at the risk of negative impact on the user base. Thus, minimizing the negative impact of the downtime during maintenance, in particular, for cell sites is paramount for an optimal up-to-date operation of a RAN network.

In the related art, approaches to minimize the negative impact include strategies focused on upgrading a small number of cell sites at a time (i.e., serially upgrading a low number of simultaneously upgraded cell sites in the network reduces the risk of a negative impact). This serial upgrading in the related art results in multi-day upgrade schedules. In the related art, a random selection of cell sites to be upgraded at the same time may speed up the upgrade schedules, however, the negative impact of randomly selected cell sites upgraded at the same time is high and may be unsatisfactory to both the network operators and the RAN users. For example, by randomly selecting cell sites for simultaneous upgrade, neighboring cell sites with overlapping coverage areas may both be shut down simultaneously leaving no coverage whatsoever for subscribers in those areas.

SUMMARY

According to embodiments, systems and methods are provided for selecting an upgrade sequence of cell sites in a radio access network, wherein the selection of the upgrade sequence considers a coverage overlap to when determining cell sites for simultaneous upgrade. As a result, systems and methods of example embodiments can realize significantly faster execution of maintenance schedules (i.e., upgrade schedules) and minimize additional risk of adverse impact on the RAN (i.e., on RAN users).

According to embodiments, an apparatus for selecting an upgrade sequence of cell sites in a radio access network includes: a memory storing instructions; and at least one processor configured to execute the instructions to: determine, for each cell site pair from among a plurality of cell sites, a pairing score based on a coverage overlap between the cell sites, split the plurality of cell sites into at least two batches based on the determined pairing score for each cell site pair, and determine which cell sites, of the plurality of cell sites, can be upgraded simultaneously based on the split into the at least two batches.

The at least one processor may be further configured to execute the instructions to: repeat, within each successive batch, the determining of the pairing score for each cell site pair within the batch and the splitting of cell sites within the batch based on the determined pairing score for each cell site pair within the batch, until a predetermined number of batches and/or network segments are reached.

The at least one processor may be further configured to execute the instructions to: split the plurality of cell sites based on the determined pairing score by using a graph neural network to split the cell site pairs.

The at least one processor may be further configured to execute the instructions to: randomly split cell site pairs having a pairing score less than or equal to a predetermined threshold.

The at least one processor may be further configured to execute the instructions to: prior to an initial determining of pairing scores and splitting into batches, randomly split the cell sites in the radio access network a predetermined number of times into initial batches, such that the initial determining of pairing scores is performed with respect to the initial batches.

The at least one processor may be further configured to execute the instructions to: split the plurality of cell sites based on the determined pairing score by using a graph neural network to split the cell site pairs, until a predetermined number of batches and/or network segments are reached.

The pairing score may be determined based on a coverage overlap that is weighted by at least one weighting factor, wherein the at least one weighting factor for determining the pairing score may include at least one criteria of at least one criteria of a user count data, throughput data and/or a handover success data.

The at least one processor may be further configured to execute to the instructions to: update each weight of the at least one weighting factor based on at least one feedback parameter.

According to embodiments, a method for selecting an upgrade sequence of cell sites in a radio access network includes: determining, for each cell site pair from among a plurality of cell sites, a pairing score based on a coverage overlap between the cell sites, splitting the plurality of cell sites into at least two batches based on the determined pairing score for each cell site pair, and determining which cell sites, of the plurality of cell sites, can be upgraded simultaneously based on the split into the at least two batches.

The method may further include repeating, within each successive batch, the determining of the pairing score for each cell site pair within the batch and the splitting of cell sites within the batch based on the determined pairing score for each cell site pair within the batch, until a predetermined number of batches and/or network segments are reached.

The method may further include splitting the plurality of cell sites based on the determined pairing score by using a graph neural network to split the cell site pairs.

The method may further include randomly splitting cell site pairs having a pairing score less than or equal to a predetermined threshold.

The method may further include prior to an initial determining of pairing scores and splitting into batches, randomly splitting the cell sites in the radio access network a predetermined number of times into initial batches, such that the initial determining of pairing scores is performed with respect to the initial batches.

The method may further include splitting the plurality of cell sites based on the determined pairing score by using a graph neural network to split the cell site pairs, until a predetermined number of batches and/or network segments are reached.

The pairing score may be determined based on a coverage overlap that is weighted by at least one weighting factor, wherein the at least one weighting factor which may include at least one of a user count data factor, a throughput data factor or a handover success data factor.

The method may further include updating each weight of the at least one weighting factor based on at least one feedback parameter.

According to embodiments, a non-transitory computer readable recording medium has recorded thereon instructions executable by at least one processor to perform a method for selecting an upgrade sequence of cell sites in a radio access network, the method including: determining, for each cell site pair from among a plurality of cell sites, a pairing score based on a coverage overlap between the cell sites, splitting the plurality of cell sites into at least two batches based on the determined pairing score for each cell site pair, an determining which cell sites, of the plurality of cell sites, can be upgraded simultaneously based on the split into the at least two batches.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIGS. 3A, 3B, 3C and 3D illustrate an example for selecting an upgrade sequence of cell sites in a radio access network according to one embodiment;

DETAILED DESCRIPTION

Figure 1:
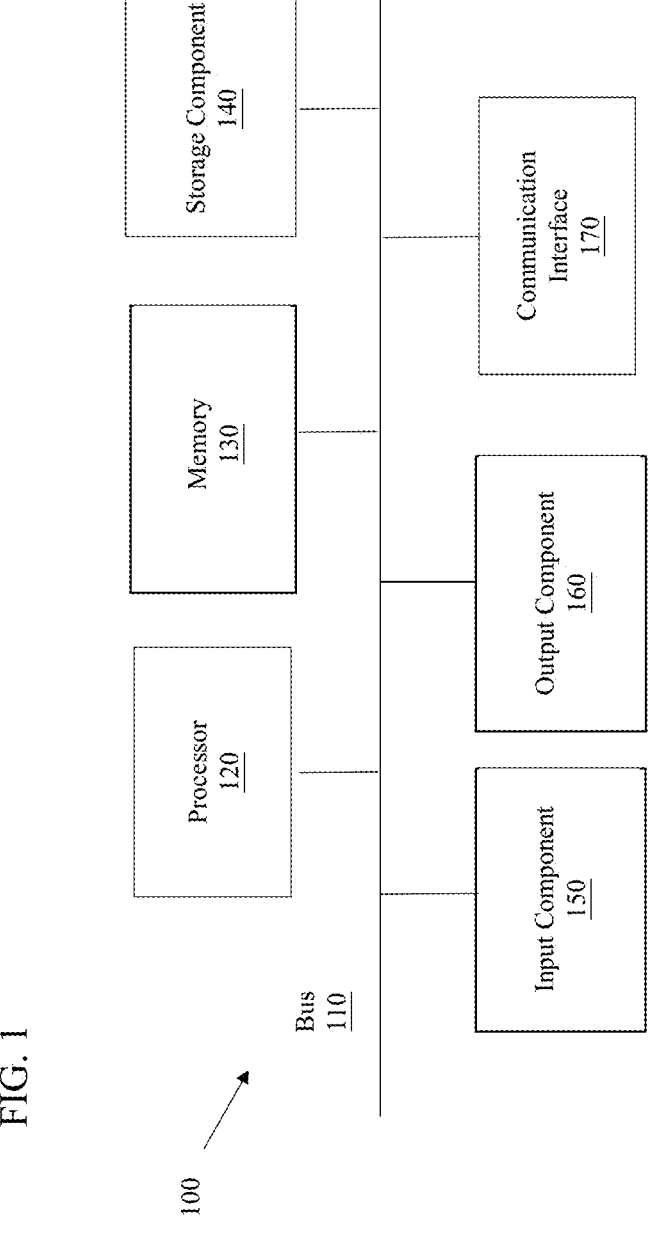
FIG. 1 is a diagram of example components of a device according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide an apparatus, method and a non-transitory computer-readable recording medium for selecting cell sites to be simultaneously upgraded in a radio access network (RAN) upgrade schedule, by considering a coverage area of the cell sites in the RAN. As a result, the number of devices disconnected from the RAN (e.g., with no coverage at all) at any given time is minimized.

FIG. 1 is a diagram of example components of a device 100. Device 100 may correspond to user device 110 and/or platform 120. As shown in FIG. 1, device 100 may include a bus 110, a processor 120, a memory 130, a storage component 140, an input component 150, an output component 160, and a communication interface 170.

Bus 110 includes a component that permits communication among the components of device 100. Processor 120 may be implemented in hardware, firmware, or a combination of hardware and software. Processor 120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 120 includes one or more processors capable of being programmed to perform a function. Memory 130 includes a random access memory (RAM), a read only memory (ROM), and/or another type of dynamic or static storage device (e.g., a flash memory, a magnetic memory, and/or an optical memory) that stores information and/or instructions for use by processor 120.

Storage component 140 stores information and/or software related to the operation and use of device 100. For example, storage component 140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 150 includes a component that permits device 100 to receive information, such as via user input (e.g., a touch screen display, a keyboard, a keypad, a mouse, a button, a switch, and/or a microphone). Additionally, or alternatively, input component 150 may include a sensor for sensing information (e.g., a global positioning system (GPS) component, an accelerometer, a gyroscope, and/or an actuator). Output component 160 includes a component that provides output information from device 100 (e.g., a display, a speaker, and/or one or more light-emitting diodes (LEDs)).

Communication interface 170 includes a transceiver-like component (e.g., a transceiver and/or a separate receiver and transmitter) that enables device 100 to communicate with other devices, such as via a wired connection, a wireless connection, or a combination of wired and wireless connections. Communication interface 170 may permit device 100 to receive information from another device and/or provide information to another device. For example, communication interface 170 may include an Ethernet interface, an optical interface, a coaxial interface, an infrared interface, a radio frequency (RF) interface, a universal serial bus (USB) interface, a Wi-Fi interface, a cellular network interface, or the like. Device 100 may perform one or more processes described herein. Device 100 may perform these processes in response to processor 120 executing software instructions stored by a non-transitory computer-readable medium, such as memory 130 and/or storage component 140. A computer-readable medium is defined herein as a non-transitory memory device. A memory device includes memory space within a single physical storage device or memory space spread across multiple physical storage devices.

Software instructions may be read into memory 130 and/or storage component 140 from another computer-readable medium or from another device via communication interface 170. When executed, software instructions stored in memory 130 and/or storage component 140 may cause processor 120 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 1 are provided as an example. In practice, device 100 may include additional components, fewer components, different components, or differently arranged components than those shown in FIG. 1. Additionally, or alternatively, a set of components (e.g., one or more components) of device 100 may perform one or more functions described as being performed by another set of components of device 100.

In embodiments, any one of the operations or processes of FIGS. 2 to 5 may be implemented by using any one of the elements illustrated in FIG. 1.

Figure 2:
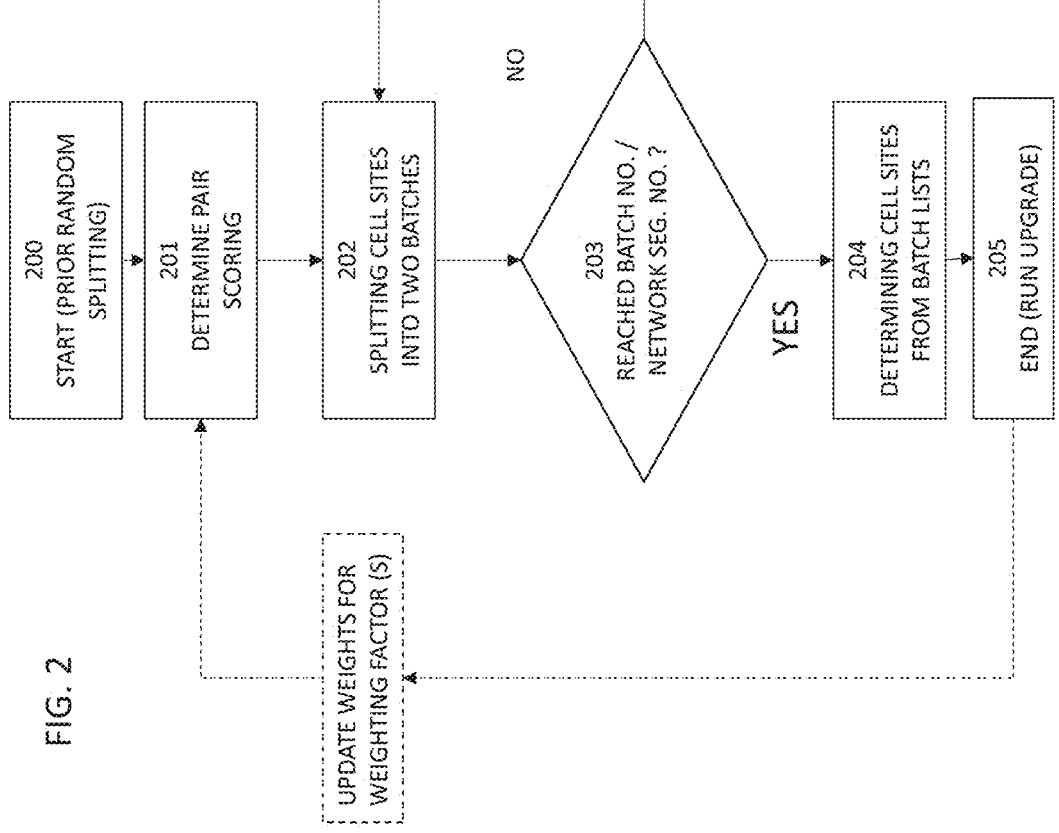
FIG. 2 illustrates a flow diagram of a method for selecting an upgrade sequence of cell sites in a radio access network according to one or more embodiments.

FIG. 2 illustrates a flow diagram of a method for selecting an upgrade sequence of cell sites in a radio access network according to one or more embodiments. The method may be implemented by at least one processor executing instructions. The method of FIG. 2 determines an upgrade sequence by determining optimal batches of cell sites to be simultaneously upgraded.

Referring to the FIG. 2, in step 200, the method may include a network segmentation. That is, prior to initially determining pairing scores in step 201 and splitting into batches in step 203 based on the pairing scores, cell sites in the radio access network are split a predetermined number of times into initial batches (or split into a predetermined number of batches). For example, the splitting may be random (although in other embodiments, the splitting may be based on one or more parameters of factors). The initial splitting of cell sites in the radio access network has the advantage that a high number of cell sites can be broken down to a lower number of cell sites in each of the initial batches to be respectively processed in the subsequent steps. For example, if the number of cell sites to be upgraded is 1000, step 200 may randomly split the 1000 cell sites into four batches of 250 cell sites. As a result, the subsequent processing on each pair of cell sites in a batch can start with a smaller number of cell sites in each batch, thereby reducing processing load and computational complexity as well as processing time. That is, by splitting the total number of cell sites into plural batches initially, the total number of pairs on which subsequent processing is performed (as set forth below) is reduced since the pairing of cell sites is batch-specific.

Referring to the following steps in FIG. 2, in order to accurately determine which cell sites should belong in which batch of an upgrade plan, the coverage overlap that exists between the different cell sites is determined. To this end, network topology data (e.g., key performance indicators (KPIs)) can be used to quantify the coverage overlap between cell sites. As a result, cell sites that have coverage overlap (or significant coverage overlap) will not be placed in the same final batch (i.e., will not be upgraded simultaneously). This allows devices within a coverage area of a cell site that is shut down due to an upgrade to be able to maintain a connection to the RAN via a cell site with coverage overlap.

In step 201, the method may include determining, for each cell site pair from among a plurality of cell sites within each batch (i.e., from a plurality of cell sites within an initial batch), a pairing score. The pairing score is determined based on the coverage overlap (e.g., coverage overlap percentage determined from network topology data) multiplied by a weighted sum of at least one weighting factors. The at least one weighting factor may include at least one RAN performance parameter (i.e., a key performance indicator of the RAN) of the cell site pair relevant to an impact of simultaneously shutting down the cell site pair. That is, the at least one weighting factor further quantifies the relationship between the cell sites in the cell site pair. The pairing score of a cell site pair may be used as a criterion to select whether two cell sites of a cell site pair can be allocated into the same batch (e.g., into the same network segment to be upgraded at the same time) or whether two cell sites of a cell site pair can be split into separate batches (e.g., into separate network segments to be upgraded at different times).

Still referring to FIG. 2, in step 201, the at least one weighting factor can be one of a user count data, throughput data, handover success data, etc. For example, relevant factors determining whether a cell site pair with coverage overlap can be simultaneously shut down include how many users are typically distributed between the two cell sites of the cell site pair, the amount of data traffic which is through-put at the two cell sites and how frequently users move between the two cell sites.

As a result, each weighting factor may improve the determining of the paring score (i.e., can make it more accurate with regard to the quantification of the coverage overlap of two cell sites). For example, regarding the user count data, a cell site pair hosting 20,000 users should be ranked more important than a cell site pair hosting only 2 users (i.e., there is greater risk of negative impact by simultaneously upgrading the coverage overlap pair with a higher number of total connected devices than that with the lower number of total connected devices). Moreover, a pair of cell sites with a large number of successful handovers means that users can easily switch between cell sites of a cell site pair, if one of the cell sites is upgraded (i.e., shutdown). As a result, if both cell site are upgraded at the same time, the users in this cell site pair may more likely suffer a connection loss to the RAN. Furthermore, the amount of data traffic in a cell site pair is a performance indicator of how many users are active in the cell sites of the cell site pair. Therefore, data traffic is an important indicator about how many users may be exposed to a potential negative impact if both cell sites of the cell site pair are upgraded at the same time.

Still referring to step 201 in FIG. 2, the paring score between cell sites (e.g., a cell site A and a cell site B) within a batch can be calculated as a weighted percentage of coverage overlap between said cell sites. If the overlap between cell site A and cell site B is zero, the respective pairing score between the cell sites A and B is zero. This relation satisfies the principle that independent cell sites with zero coverage overlap can be upgraded simultaneously since the two cell sites have no impact on each other (e.g., a cell site in Osaka has no impact on a cell in Tokyo).

Still referring to step 201 in FIG. 2, in an example embodiment, the method may include updating each weight of the at least one weighting factor based on at least one feedback parameter. Thus, each weight of each weighting factor can individually impact the calculation of the pairing score (i.e., a weight can update the weighting factor to make a pairing score more optimal to reduce negative feedback). In an example embodiment, the calculation of the pairing score for a cell site pair may include unidirectional or directional weighting factors. For example, a pairing score for a cell site pair may be defined by the following equation:

$$\text{paring score}_{AB} = \text{COVERAGE}_{AB}\left(\text{USER WEIGHT}\left(\frac{\text{USER}_A + \text{USER}_B}{2}\right)\right.$$
$$+ \text{THROUGHPUT WEIGHT}\left(\frac{\text{THROUGHPUT}_A + \text{THROUGHPUT}_B}{2}\right)$$
$$\left.+ \text{HANDOVER WEIGHT}\left(\frac{\text{HANDOVER}_{A \to B} + \text{HANDOVER}_{B \to A}}{2}\right)\right);$$

(Equation 1)

wherein, COVERAGE$_{AB}$ is a coverage overlap percentage between the cell sites A and B in the cell site pair, USER WEIGHT is a weight applied to a mean value of a number of users hosted in a cell site A and a number of users hosted in a cell site B (i.e., a weight factor relating to user count data), THROUGHPUT WEIGHT is a weight applied to a mean value of a traffic throughput in a cell site A and a traffic throughput in a cell site B (i.e., a weight factor relating to throughput data), HANDOVER WEIGHT is a weight applied to a mean value of a handover success rate from a cell site A to a cell site B and a handover success rate from a cell site B to a cell site A (i.e., a weight factor relating to handover success data).

Still referring to FIG. 2, in step 202, the method may include splitting a plurality of cell sites into at least two batches based on the determined pairing score for each cell site pair. For example, the splitting can segregate cell sites of cell site pairs within a batch into two batches (e.g., if there are four initial batches, then the splitting would result in eight batches). To this end, a high pairing score of a cell site pair may imply a high coverage overlap between cell sites of the cell site pair. The objective of the splitting is to form two or more batches of cell sites, whereas cell sites within each batch have a minimal coverage overlap to each other (and therefore minimize negative impact of simultaneously upgrading).

According to an embodiment, for any pairing score between two cell sites (e.g., the pairing score between a cell site A and a cell site B) within a batch that is the highest (i.e., higher than any other pairing scores of cell site pairs within the batch), the two cell sites (e.g., cell site A and cell site B) are split into different batches. For example, a cell site pair AB may have a pairing score that relates to a 90% coverage overlap. Thus, splitting the cell site pair AB into separate batches and upgrading cell site A and cell site B at different times minimizes negative impact on the RAN (i.e., discon-nected RAN users). Next, for a pairing score between two cell sites (e.g., the pairing score between a cell site D and a cell site B) within a batch that is second highest, the two cell sites (e.g., cell site D and cell site D) are split into different batches. For example, a cell site pair DB may have a pairing score that relates to an 70% coverage overlap. Thus, splitting cell site pair DB into separate batches and upgrading cell site D and cell site B at different times still minimizes negative impact on the RAN (i.e., disconnected RAN users). Thus, starting from the cell site pair with the highest paring score in a batch, the cell sites can be split into two successive batches until the cell site pair with the lowest paring score from among the cell site pairs within a batch (i.e., the last cell site pair in the initial batch) is reached.

In step 203, the method may include repeating, within each successive batch, the determining of the pairing score for each cell site pair within the batch and the splitting of cell sites within the batch based on the determined pairing score for each cell site pair within the batch, until a predetermined number of batches (or network segments) and/or predeter-mined number of splits is reached. To this end, a plurality of successive batches can be generated in an iterative process. If splitting is started with the cell site pair having the highest paring score within a batch and finished with the last cell site pair having the lowest pairing score within the batch, as set forth above, the batch with a higher number in succession (i.e., a batch that was created last in succession) in com-parison to a batch with a lower number in succession (i.e., a batch that was created first in succession) can be filled with cell sites of cell site pairs having a smaller pairing score (i.e., the higher the number in the succession of a batch, the smaller the pairing scores between cell sites within that batch).

Accordingly, in step 203, the value of pairing scores of cell site pairs to be split can be decreased with each iteration of the splitting (i.e., with each successive splitting into two successive batches). As a result, with each splitting into two successive batches, the RAN network can be segregated further into two smaller network segments (i.e., the smaller the network segments are, the smaller the pairing score between cell sites in the network segments can become). This means that the smallest network segments (i.e., batches) may include cell sites with the least coverage overlap, which has the advantageous effect that, when upgrading the cell sites, a minimum of negative impact on the RAN (i.e., RAN users) can be achieved.

Still referring to step 203, the method may include an algorithm such as a combinatorial optimization algorithm, and in particular, a mathematical maximum cut graph algorithm. In order to use combinatorial optimization for the splitting in steps 202 and 203, graphs can denote locations between cell sites as nodes. Moreover, the pairing scores can denote indices of weighted edges of the graphs. The graphs can be split to subgraphs by cutting out as many large edges as possible. In an example embodiment, the method may include splitting the plurality of cell sites based on the determined pairing score by using a graph neural network to split the cell site pairs, wherein the graph neural network may be based on an algorithm such as a combinatorial optimization algorithm, and in particular, a mathematical maximum cut graph algorithm.

Still referring to the FIG. 2, in an example embodiment, the network operator may obtain a predetermined tolerance to limit to the scope of optimization in order to take into account the limits of what is economically and technically feasible. To do this, as explained in step 200, the method may include, prior to an initial determining of pairing scores and splitting into batches, splitting (e.g., randomly splitting) the cell sites in the radio access network a predetermined number of times into initial batches, such that the initial determining of pairing scores is performed with respect to the initial batches. Based on the initial batches generated by the prior splitting, the method may include initial splitting of the plurality of cell sites in each batch based on the determined pairing score by using a graph neural network to split the cell site pairs, until a predetermined number of batches and/or network segments are reached. For example, if the number of batch splits is predetermined to be 4, the first two splits can be done by randomly splitting cell sites, followed by a graph neural network split for the successive two batch splits in order to obtain faster results to the batch splitting operation.

In step 204, the cell sites which can be upgraded at the same time may be determined. To this end, the method may include determining which cell sites, of the plurality of cell sites, can be upgraded simultaneously based on the split into the at least two batches (i.e., based on the batches generated in steps 202 and 203). Each batch may provide a list of cell sites that can be simultaneously upgraded in the radio access network. Moreover, each batch is assigned an integer number corresponding to which batch the cell site should belong to during network maintenance (e.g., a network software upgrade). The batch number may be independent of the time it takes to run a maintenance plan (e.g., a network software upgrade) or the order of batches to be run during network maintenance. As a result, a network operator may use the batches to further the optimize time management of a maintenance plan (i.e., to determine a sequential order of batches which may work through a maintenance plan in the fastest way). This sequence of cell site to be upgraded may be based on the sequential order (e.g., a chronological order) of the batches to be run during network maintenance plan (e.g., a network software upgrade). To this end, in an example embodiment, the method may include determining which cell sites, of the plurality of cell sites, can be upgraded simultaneously based a sequential order of batches to be run during network maintenance (e.g., a network software upgrade).

Still referring to FIG. 2, in step 205, the batches can be run (or provided) as part of a maintenance plan to, for example, upgrade network software. Based on feedback to execution of the maintenance plan (e.g., based on an evaluation of customer complaints and/or factors contributing to those complaints), the weights can be adjusted to update the at least one weighting factor, as set forth in step 201.

FIGS. 3A, 3B, 3C and 3D illustrate an example for selecting an upgrade sequence of cell sites in a radio access network according to one embodiment. Referring to FIG. 3A, for simplification sake, a RAN may include only 6 cell sites A to F. In FIG. 3, the cell sites A, E and B are located closer together than the cell sites F, D and C. Cell site C is the most remote and cell sites F and D in comparison to other cell sites are located closest to each other. As a result, the paring scores between cell sites A, E and B may be higher than those of cell sites F, D and C, wherein a cell site pair which may include cell site C has the smallest paring scoring.

Referring to FIG. 3B, the relationship (i.e., the coverage overlap) between the cell sites of FIG. 3A may be illustrated by graphs. For example, a graph (i.e., edge) AF represents the paring score (i.e., existence of a coverage overlap and therefore pairing score) between cell site A and cell site F, a graph AE represents the score between cell site A and cell site E, a graph DF represents the score between cell site D and cell site F, a graph DE represents the score between cell site D and cell site E, a graph DE represents the score between cell site D and cell site E, a graph BD represents the score between cell site B and cell site D and a graph BC represents the score between cell site B and cell site C, respectively.

Referring to FIG. 3C, each graph (i.e., cell site pair) of FIG. 3B can have a respective pairing score. The terms graph and cell site pair are used interchangeably. For example, graph AF may have a pairing score of 0.8, graph AE may have pairing score of 0.9, graph DF may have a pairing score of 0.7, graph DE may have pairing score of 0.6, graph BE may have a pairing score of 0.6, graph BD may have pairing score of 0.7 and graph BC may have a pairing score of 0.7.

In FIG. 3C, the cell site pair AE has the highest pairing score of 0.9, and therefore, cell site A and cell site E are split into different batches. The cell site pair AF has the second highest pairing score of 0.8 and therefore cell site A and cell site F may be split into different batches. The paring scores of cell site pairs DF, BD and BC are similar. Therefore cell site D and cell site F may be divided into different batches, cell site B and cell site D may be divided into different batches and cell site B and cell site C may be divided into different batches. Finally, the cell site pairs DE and BE having the lowest pairing score are assigned to the same batch in a first iteration of batch splits.

Still referring to FIG. 3C, the second batch of the first iteration in FIG. 3C may include cell sites B, E and F. The cell site pair BE may have a pairing score of 0.6. Moreover, the cell site pair BE may have the highest pairing score, because (as set forth above) in absence of respective graphs (i.e., pairing scores) between cell sites, the pairing scores of cell site pair BF and cell site pair EF are zero. Accordingly, cell sites B and E may be split in different batches in a successive split. As a result, the second iteration (i.e., the split of cell sites B and E), decreases the value of the pairing scores of cell site pairs of the remaining cells to zero, which may allow for a simultaneous upgrade of these cell sites. In the example of FIG. 3C, a third iteration of batch splits may be done randomly.

FIG. 3D illustrates a relationship (the coverage overlap) of cell sites after a first iteration of splits as shown in FIG. 3C. In this example, only the graph between the cell sites B and E remains (i.e., the cell site pair BE remains with a pairing score of 0.6), whereas all other cell sites in FIG. 3D may not have a coverage overlap (i.e., a pairing score of zero). After a second iteration of splits, all graphs between the cell sites (including the graph of the cell site pair BE) are resolved (i.e., the pairing score of all cell site pairs may be zero).

Figure 4:
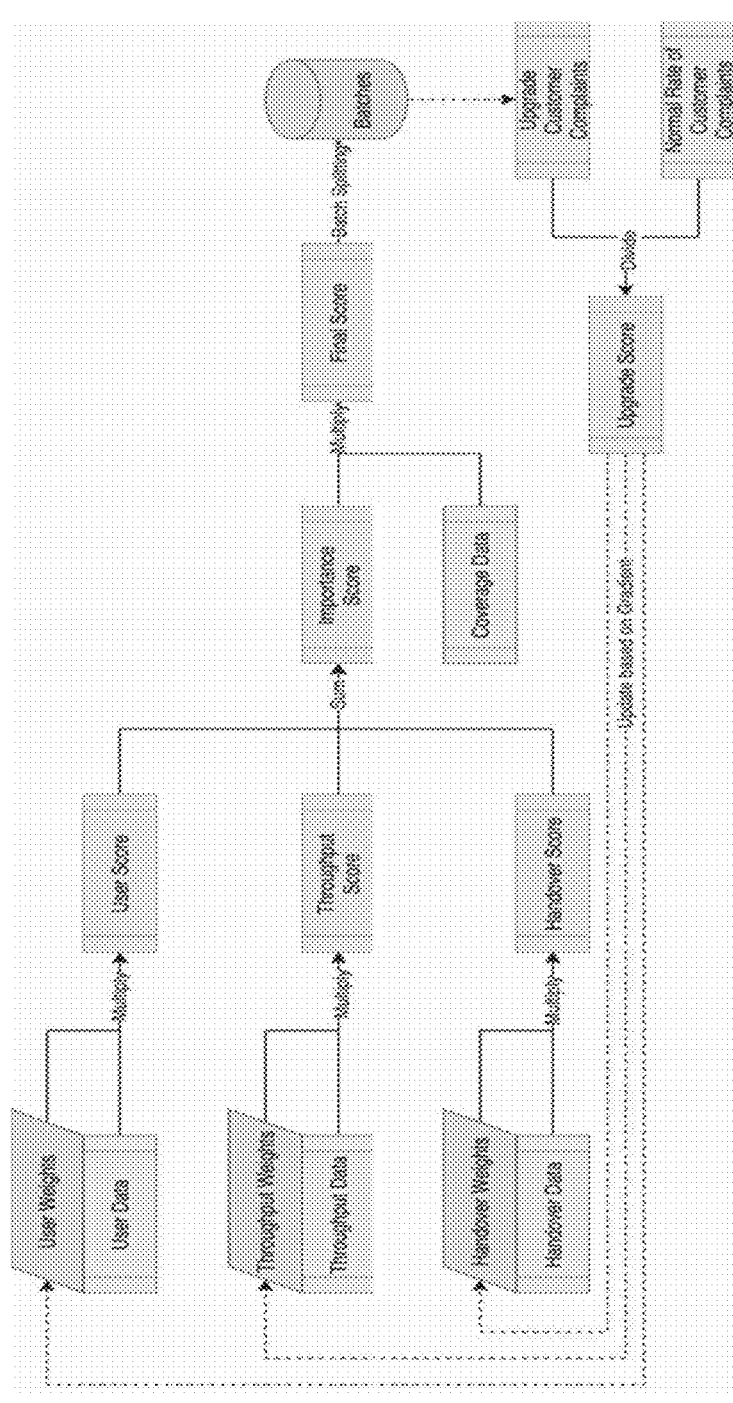
FIG. 4 illustrates an update of at least one weighting factor based feedback parameters according to one embodiment.

FIG. 4 illustrates an update of at least one weighting factor based on feedback parameters according to one embodiment. Referring to FIG. 4, in an example embodiment, the weighting factors may include the number of users, the throughput and the handover success rate of a cell site pair to generate the paring score between the two cell sites of the cell site pair according to equation 1. In FIG. 4, each weight (i.e., user weight, throughput weight, handover weight) may be multiplied with each respective weighting factor to refine (i.e., update) the calculation of the pairing score.

To this end, the update of the weights is determined based on an impact of a network maintenance (i.e., an impact of a run of batches during network maintenance) on RAN users. The impact may be measured by the amount of RAN user complaints in response to a network maintenance. The amount of user complaints after maintenance may be compared with the amount of user complaints during normal operation of the RAN (or during a past network maintenance) and an update of the weights may be determined based on the comparison. The next time the method is executed to determine batches for a maintenance plan, the importance score (i.e., the weighted sum of the weighting factors that is multiplied or applied to the coverage overlap percentage) is calculated using the updated weights.

In FIG. 4, in an example embodiment, the method may include an upgrade of the weight factors based on shortcomings of a maintenance plan (i.e., a complaint feedback of users about connection loss in cell sites). For example, a cell site in a sports stadium may cause considerable negative impact on RAN users if switched off during a weekend sporting event. Alternatively, for example, a cell site in a business district may be operating at minimal capacity during the holiday season and therefore have less impact than usual. As result, though both cell sites may have a low pairing score at certain times (i.e., low impact), a network maintenance at a wrong time may trigger a large number of user complaints. Based on this amount of RAN user complaints, the pairing score may be adjusted by updating the weights as set forth above (i.e., an update to refine the calculation of the paring score for cell site pairs including such cell sites).

Figure 5:
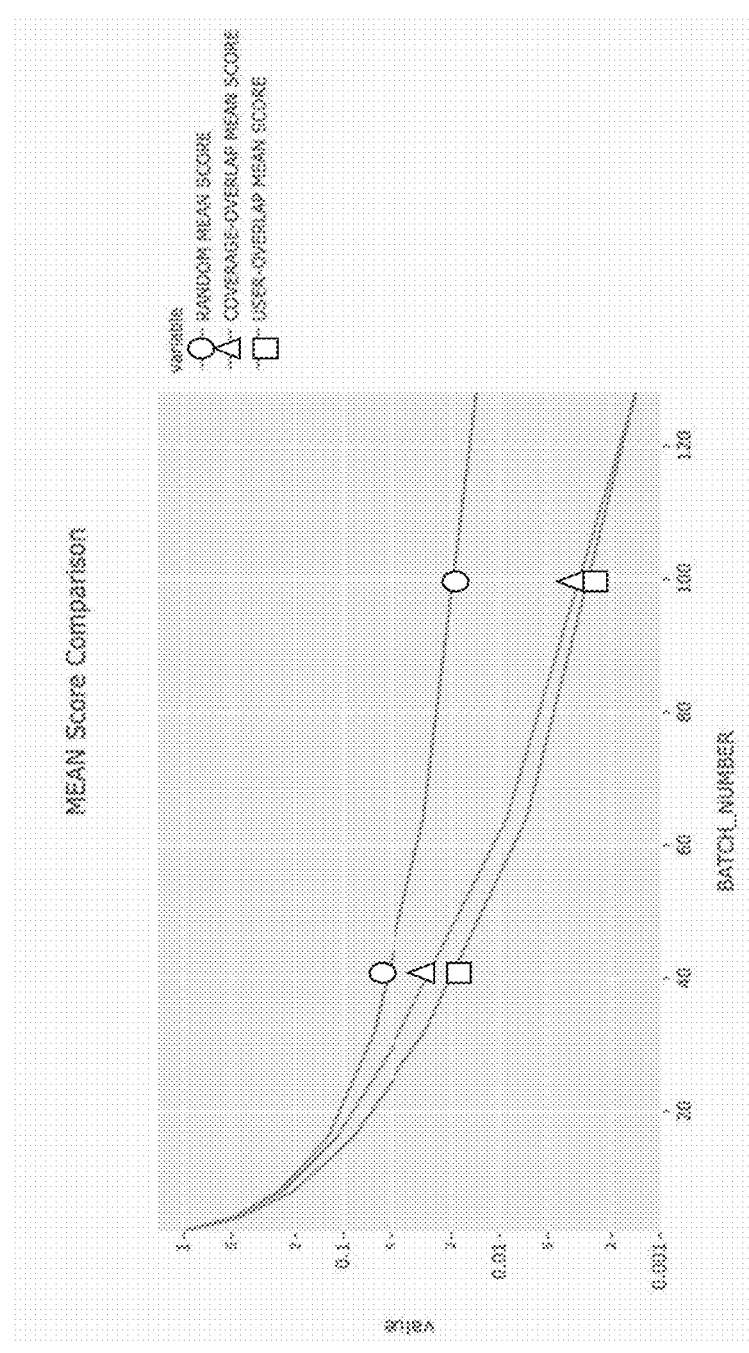
FIG. 5 illustrates the impact of different weighting factors on the method for selecting an upgrade sequence of cell sites in a radio access network according to one or more embodiments.

FIG. 5 illustrates experimental data with respect to the impact of different weighting factors on the method for selecting an upgrade sequence of cell sites in a radio access network according to one or more embodiments. Referring to FIG. 5, the experimental results were obtained by applying the method to 16,000 cell sites. In FIG. 5, the relation between the increase of iteration steps (i.e., successive splitting or number of final batches) and the decrease of pairing score based on the splitting is shown in iteration curves. The iteration curves illustrate the importance of the weighted factors and the number of batches for determining a meaningful pairing score. In FIG. 5, the X-axis denotes the number of successive batches created (i.e., the number of iteration), the Y-axis denotes a relative remaining overlap between cell sites in each batch per successive split.

In FIG. 5, the iteration curve of the related art (i.e., randomly splitting) is denoted with a point in its solid line. The iteration curve of the related art may present a benchmark to iteration curves of splits using pairing scores as determined in step 201 of FIG. 2. These iteration curves are denoted with a triangle and square in their solid line, respectively. For example, a pairing score based on throughput data and handover data results in the iteration curve with a triangle in the solid line. Moreover, a pairing score based on user data, throughput data and handover data results in the iteration curve with a square in the sold line.

From the different iteration curves illustrated in FIG. 5, it can be understood that at 40th successive batch the random splitting reached a relative remaining overlap score of 0.05. In comparison, according to the iteration curve with a triangle in the solid line, the relative remaining overlap decreased to 0.03 at the 40th successive batch.

The optimal result is shown by the iteration curve with a square in the solid line. Here, the relative remaining overlap decreased to a value of 0.02 (i.e., 50% below the pairing score of the related art) at the $40^{th}$ successive batch.

At the 100th batches the difference to the related art becomes even more visible, as the iteration curves decrease to 0.003 and 0.002 (i.e., approximately ten times lower pairing score compared to the related art), respectively.

According to example embodiments of the disclosure, the apparatuses, methods and a non-transitory computer readable storage media provide for a selection of cell sites to be simultaneously upgraded based on a quantification of coverage overlap between the cell sites. As a result, negative impact on RAN users and a number of disconnected devices due to a network upgrade can be minimized.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus for selecting an upgrade sequence of cell sites in a radio access network, the apparatus comprising:
   a memory storing instructions, and
   at least one processor configured to execute the instructions to:
   determine, for each cell site pair from among a plurality of cell sites, a pairing score based on a coverage overlap between the cell sites,
   split the plurality of cell sites into at least two batches based on the determined pairing score for each cell site pair, and
   determine which cell sites, of the plurality of cell sites, can be upgraded simultaneously based on the split into the at least two batches, wherein the at least one processor is further configured to execute the instructions to randomly split cell site pairs having a pairing score less than or equal to a predetermined threshold.

2. The apparatus as claimed in claim 1, wherein the at least one processor is further configured to execute the instructions to:

repeat, within each successive batch, the determining of the pairing score for each cell site pair within the batch and the splitting of cell sites within the batch based on the determined pairing score for each cell site pair within the batch, until a predetermined number of batches and/or network segments are reached.

3. The apparatus as claimed in claim 1, wherein the at least one processor is further configured to execute the instructions to:

split the plurality of cell sites based on the determined pairing score by using a graph neural network to split the cell site pairs.

4. The apparatus as claimed in one of claim 1, wherein the at least one processor is further configured to execute the instructions to:

prior to an initial determining of pairing scores and splitting into batches, randomly split the cell sites in the radio access network a predetermined number of times into initial batches, such that the initial determining of pairing scores is performed with respect to the initial batches.

5. The apparatus as claimed in one of claim 4, wherein the at least one processor is further configured to execute the instructions to:

split the plurality of cell sites based on the determined pairing score by using a graph neural network to split the cell site pairs, until a predetermined number of batches and/or network segments are reached.

6. The apparatus as claimed in claim 1, wherein:

the pairing score is determined based on the coverage overlap that is weighted by at least one weighting factor; and the at least one weighting factor comprises at least one of a user count data factor, a throughput data factor or a handover success data factor.

7. The apparatus as claimed in claim 6, wherein the at least one processor is further configured to execute the instructions to:

update each weight of the at least one weighting factor based on at least one feedback parameter.

8. A method for selecting an upgrade sequence of cell sites in a radio access network, the method comprising:

determining, for each cell site pair from among a plurality of cell sites, a pairing score based on a coverage overlap between the cell sites;

splitting the plurality of cell sites into at least two batches based on the determined pairing score for each cell site pair; and determining which cell sites, of the plurality of cell sites, can be upgraded simultaneously based on the split into the at least two batches, wherein the splitting comprises randomly splitting cell site pairs having a pairing score less than or equal to a predetermined threshold.

9. The method as claimed in claim 8, further comprising:

repeating, within each successive batch, the determining of the pairing score for each cell site pair within the batch and the splitting of cell sites within the batch based on the determined pairing score for each cell site pair within the batch, until a predetermined number of batches and/or network segments are reached.

10. The method as claimed in claim 8, further comprising:

splitting the plurality of cell sites based on the determined pairing score by using a graph neural network to split the cell site pairs.

11. The method as claimed in claim 8, further comprising:

prior to an initial determining of pairing scores and splitting into batches, randomly splitting the cell sites in the radio access network a predetermined number of times into initial batches, such that the initial determining of pairing scores is performed with respect to the initial batches.

12. The method as claimed in claim 11, further comprising:

splitting the plurality of cell sites based on the determined pairing score by using a graph neural network to split the cell site pairs, until a predetermined number of batches and/or network segments are reached.

13. The method as claimed in claim 8, wherein:

the pairing score is determined based on the coverage overlap that is weighted by at least one weighting factor; and the at least one weighting factor comprises at least one of a user count data factor, a throughput data factor or a handover success data factor.

14. The method as claimed in claim 13, further comprising:

update each weight of the at least one weighting factor based on at least one feedback parameter.

15. A non-transitory computer readable recording medium having recorded thereon instructions executable by at least one processor to perform a method for selecting an upgrade sequence of cell sites in a radio access network, the method comprising:

determining, for each cell site pair from among a plurality of cell sites, a pairing score based on at least one weighting factor that quantifies a coverage overlap between the cell sites, splitting the plurality of cell sites into at least two batches based on the determined pairing score for each cell site pair, and determining which cell sites, of the plurality of cell sites, can be upgraded simultaneously based on the split into the at least two batches, wherein the splitting comprises randomly splitting cell site pairs having a pairing score less than or equal to a predetermined threshold.

16. The non-transitory computer readable recording medium as claimed in claim 15, further comprising:

repeating, within each successive batch, the determining of the pairing score for each cell site pair within the batch and the splitting of cell sites within the batch based on the determined pairing score for each cell site pair within the batch, until a predetermined number of batches and/or network segments are reached.

17. The non-transitory computer readable recording medium as claimed in claim 15, further comprising:

prior to an initial determining of pairing scores and splitting into batches, randomly splitting the cell sites in the radio access network a predetermined number of times into initial batches, such that the initial determining of pairing scores is performed with respect to the initial batches.

18. The non-transitory computer readable recording medium as claimed in claim 15, further comprising:

splitting the plurality of cell sites based on the determined pairing score by using a graph neural network to split the cell site pairs, until a predetermined number of batches and/or network segments are reached.

* * * * *